US011974612B2

(12) United States Patent
Cho et al.

(10) Patent No.: US 11,974,612 B2
(45) Date of Patent: May 7, 2024

(54) AEROSOL GENERATING DEVICE AND OPERATION METHOD THEREOF

(71) Applicant: KT&G CORPORATION, Daejeon (KR)

(72) Inventors: Byung Sung Cho, Gwangmyeong-si (KR); Won Kyeong Lee, Guri-si (KR); Jong Sub Lee, Seongnam-si (KR); Dae Nam Han, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 903 days.

(21) Appl. No.: 16/981,972

(22) PCT Filed: Apr. 22, 2020

(86) PCT No.: PCT/KR2020/005293

§ 371 (c)(1),
(2) Date: Sep. 17, 2020

(87) PCT Pub. No.: WO2020/222456

PCT Pub. Date: Nov. 5, 2020

(65) Prior Publication Data

US 2023/0093846 A1 Mar. 30, 2023

(30) Foreign Application Priority Data

Apr. 30, 2019 (KR) ........................ 10-2019-0050402

(51) Int. Cl.
*A24F 40/42* (2020.01)
*A24F 40/10* (2020.01)
(Continued)

(52) U.S. Cl.
CPC .............. *A24F 40/57* (2020.01); *A24F 40/10* (2020.01); *A24F 40/42* (2020.01); *A24F 40/51* (2020.01);
(Continued)

(58) Field of Classification Search
CPC ....................................................... A24F 40/46
See application file for complete search history.

(56) References Cited

U.S. PATENT DOCUMENTS 10,111,465 B2 * 10/2018 Liu ..................... H05B 1/0244
10,194,697 B2 2/2019 Fernando et al.
(Continued)

FOREIGN PATENT DOCUMENTS

CN 204091003 U 1/2015
CN 107080291 A 8/2017
(Continued)

OTHER PUBLICATIONS

Extended European Search Report dated Aug. 18, 2021 in European Application No. 20767944.0.
(Continued)

*Primary Examiner* — Cynthia Szewczyk
(74) *Attorney, Agent, or Firm* — Sughrue Mion, PLLC

(57) ABSTRACT

An aerosol generating device and an operation method thereof are disclosed. The aerosol generating device may include a heater for heating an aerosol generating material, a battery for supplying power to the heater, and a controller for dividing a preheating period for preheating the heater into a plurality of sections and controlling so that more power is supplied to the heater in a first section than in a second section among the plurality of sections.

10 Claims, 5 Drawing Sheets

(51) Int. Cl.

| | |
|---|---|
| ***A24F 40/51*** | (2020.01) |
| ***A24F 40/53*** | (2020.01) |
| ***A24F 40/57*** | (2020.01) |
| ***A24F 40/60*** | (2020.01) |
| *H05B 1/02* | (2006.01) |

(52) U.S. Cl.

CPC .............. *A24F 40/53* (2020.01); *A24F 40/60* (2020.01); *H05B 1/0227* (2013.01)

(56) References Cited

U.S. PATENT DOCUMENTS

| | | | |
|---|---|---|---|
| 10,881,144 B2 | 1/2021 | Batista et al. | |
| 11,583,008 B2 | 2/2023 | Hong et al. | |
| 2017/0042243 A1 | 2/2017 | Plojoux et al. | |
| 2017/0099878 A1 | 4/2017 | Murison et al. | |
| 2019/0116880 A1 | 4/2019 | Lau et al. | |
| 2019/0159517 A1* | 5/2019 | Ballesteros Gomez | A24B 15/167 |
| 2019/0166918 A1 | 6/2019 | Thorsen et al. | |
| 2019/0297951 A1 | 10/2019 | Kuczaj | |
| 2020/0093185 A1 | 3/2020 | Lim | |
| 2020/0120988 A1 | 4/2020 | Qiu | |
| 2020/0154772 A1 | 5/2020 | Lim et al. | |
| 2020/0237014 A1 | 7/2020 | Lee et al. | |
| 2020/0281273 A1 | 9/2020 | Kim et al. | |
| 2020/0345070 A1 | 11/2020 | Ding | |
| 2021/0068454 A1* | 3/2021 | Jung | A24F 40/57 |
| 2021/0298364 A1 | 9/2021 | Yu et al. | |

FOREIGN PATENT DOCUMENTS

| | | | | |
|---|---|---|---|---|
| CN | 107095343 | A | 8/2017 | |
| CN | 108652089 | A | 10/2018 | |
| EP | 0 845 220 | A1 | 6/1998 | |
| EP | 3 632 240 | A1 | 4/2020 | |
| JP | 2000-41654 | A | 2/2000 | |
| KR | 10-2013-0139276 | A | 12/2013 | |
| KR | 10-2015-0102924 | A | 9/2015 | |
| KR | 10-2018-0070439 | A | 6/2018 | |
| KR | 10-2019-0015224 | A | 2/2019 | |
| KR | 10-2019-0022793 | A | 3/2019 | |
| KR | 10-2019-0027952 | A | 3/2019 | |
| WO | 03/012565 | A1 | 2/2003 | |
| WO | 2014/102091 | A1 | 7/2014 | |
| WO | 2016/009202 | A1 | 1/2016 | |
| WO | 2017/001819 | A1 | 1/2017 | |
| WO | 2018/135887 | A1 | 7/2018 | |
| WO | 2018/182322 | A1 | 10/2018 | |
| WO | 2018/190590 | A2 | 10/2018 | |
| WO | 2018/195902 | A1 | 11/2018 | |
| WO | 2018/202403 | A1 | 11/2018 | |
| WO | 2018/216961 | A1 | 11/2018 | |
| WO | 2019/001386 | A1 | 1/2019 | |
| WO | 2019/031871 | A1 | 2/2019 | |
| WO | 2019/031877 | A2 | 2/2019 | |
| WO | 2019/105879 | A1 | 6/2019 | |
| WO | WO-2019192226 | A1 * | 10/2019 | A24F 47/008 |

OTHER PUBLICATIONS

Office Action dated Oct. 5, 2021 in Japanese Application No. 2020-560180.

Notification of Reason for Refusal dated Nov. 17, 2020 from the Korean Intellectual Property Office in Application No. 10-2019-0050402.

International Search Report dated Nov. 12, 2020 from the International Searching Authority in International Application No. PCT/KR2020/005293.

Office Action dated Mar. 18, 2023 from the Chinese Patent Office in Application No. 202080001799.X.

European Communication dated Jul. 26, 2023 in European Application No. 20767944.0.

* cited by examiner

[Fig. 1]
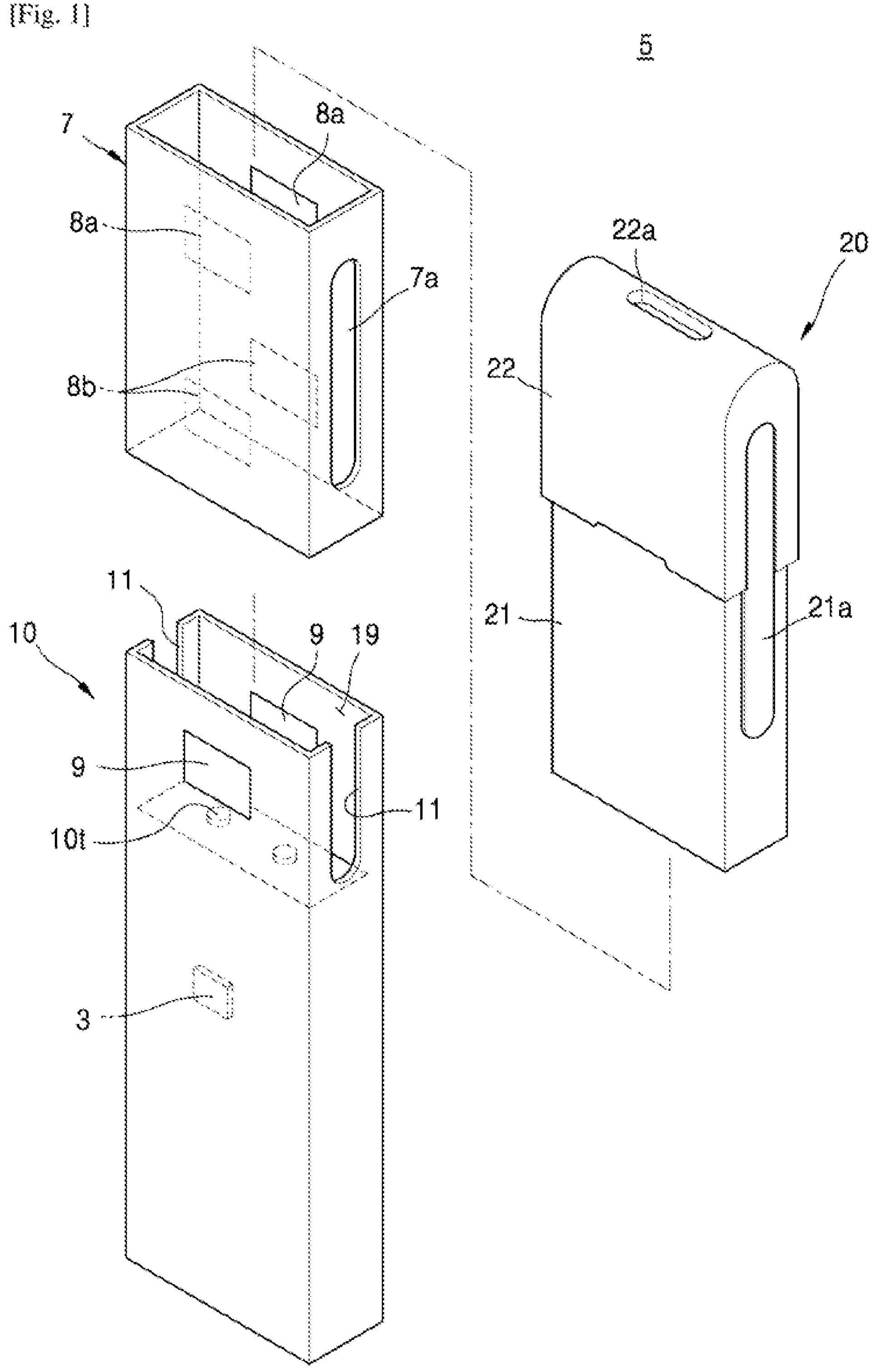

[Fig. 2]
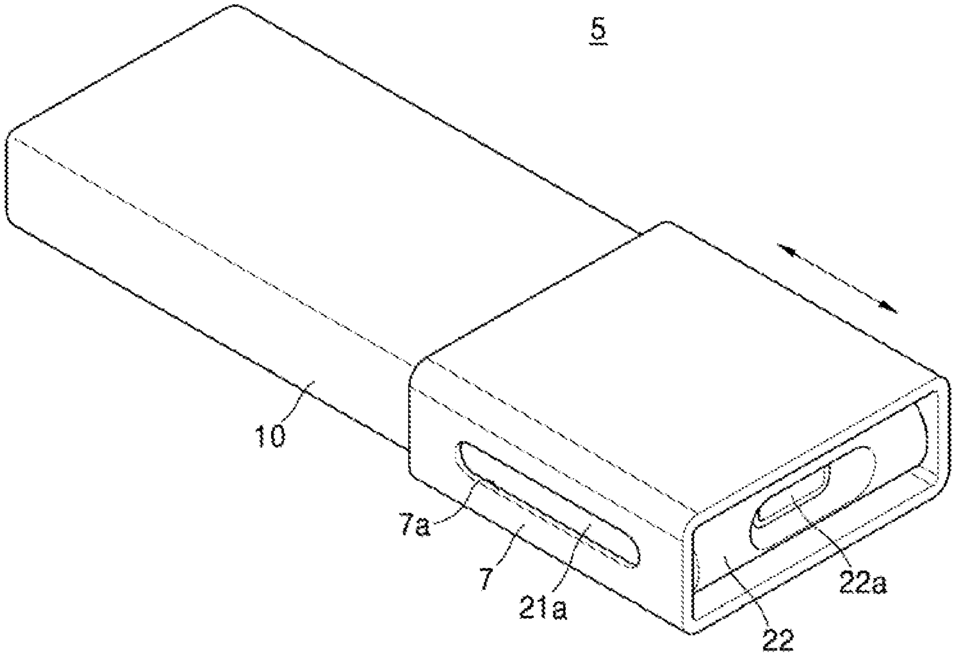
[Fig. 3]
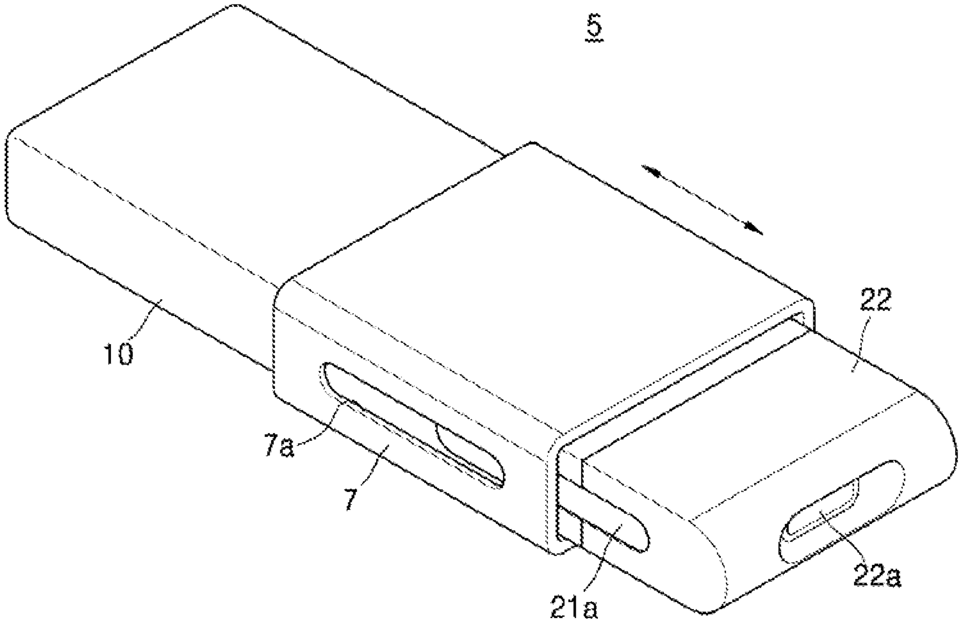

[Fig. 4]
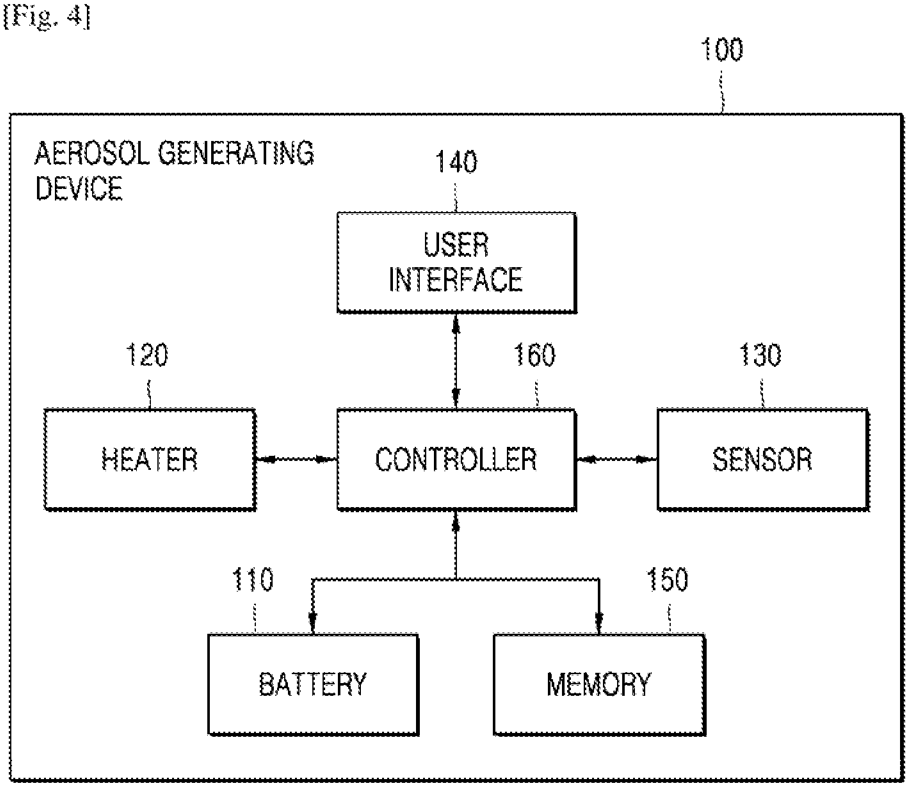
[Fig. 5]
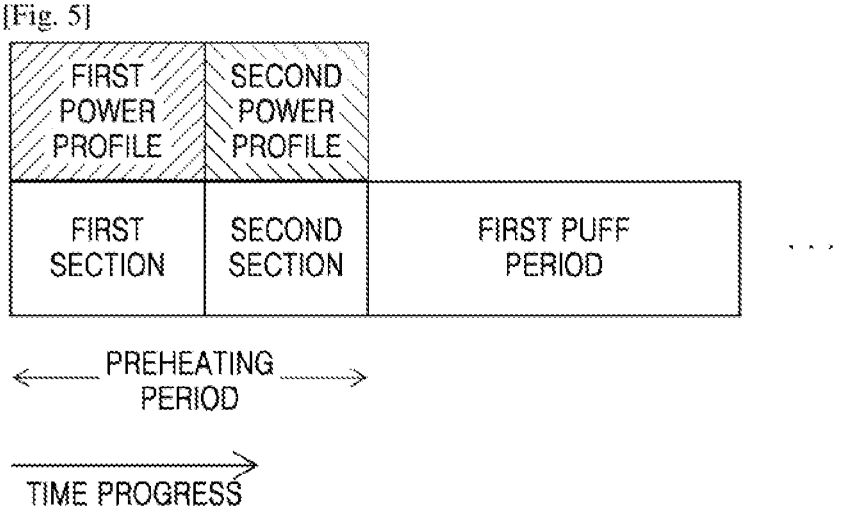

[Fig. 6]
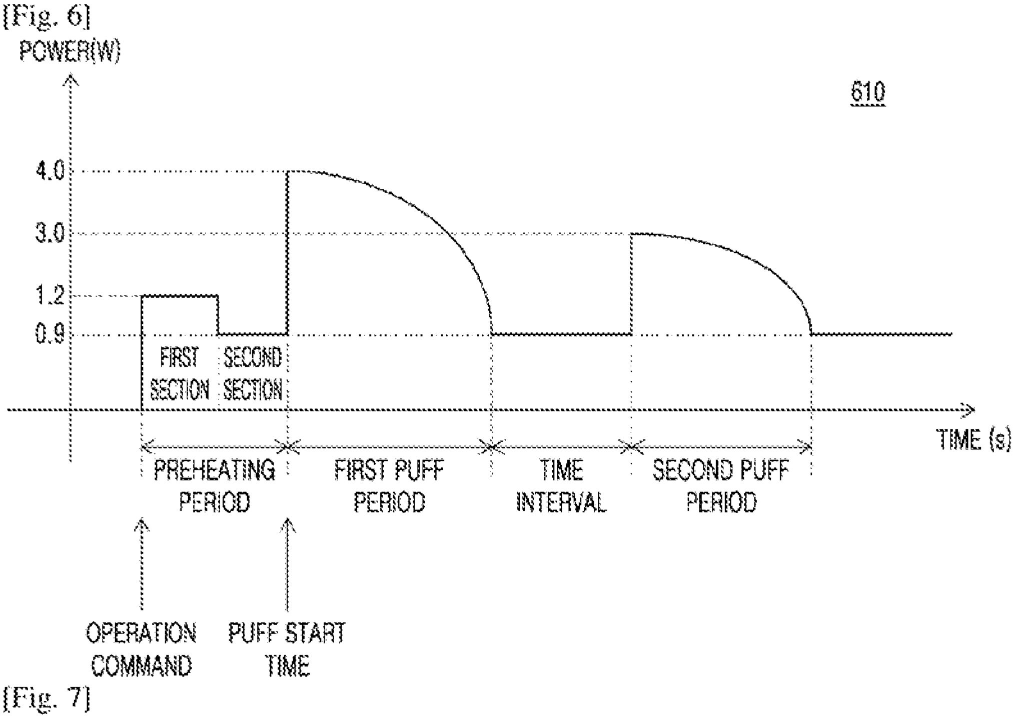
[Fig. 7]
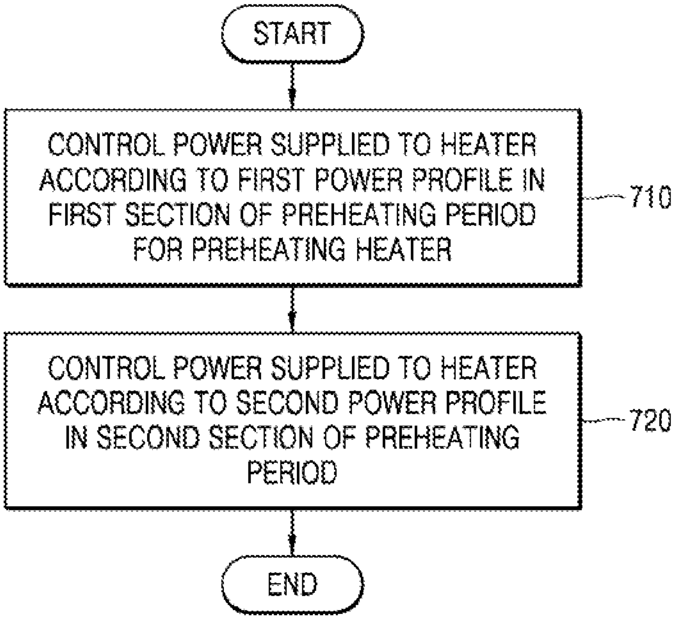

[Fig. 8]
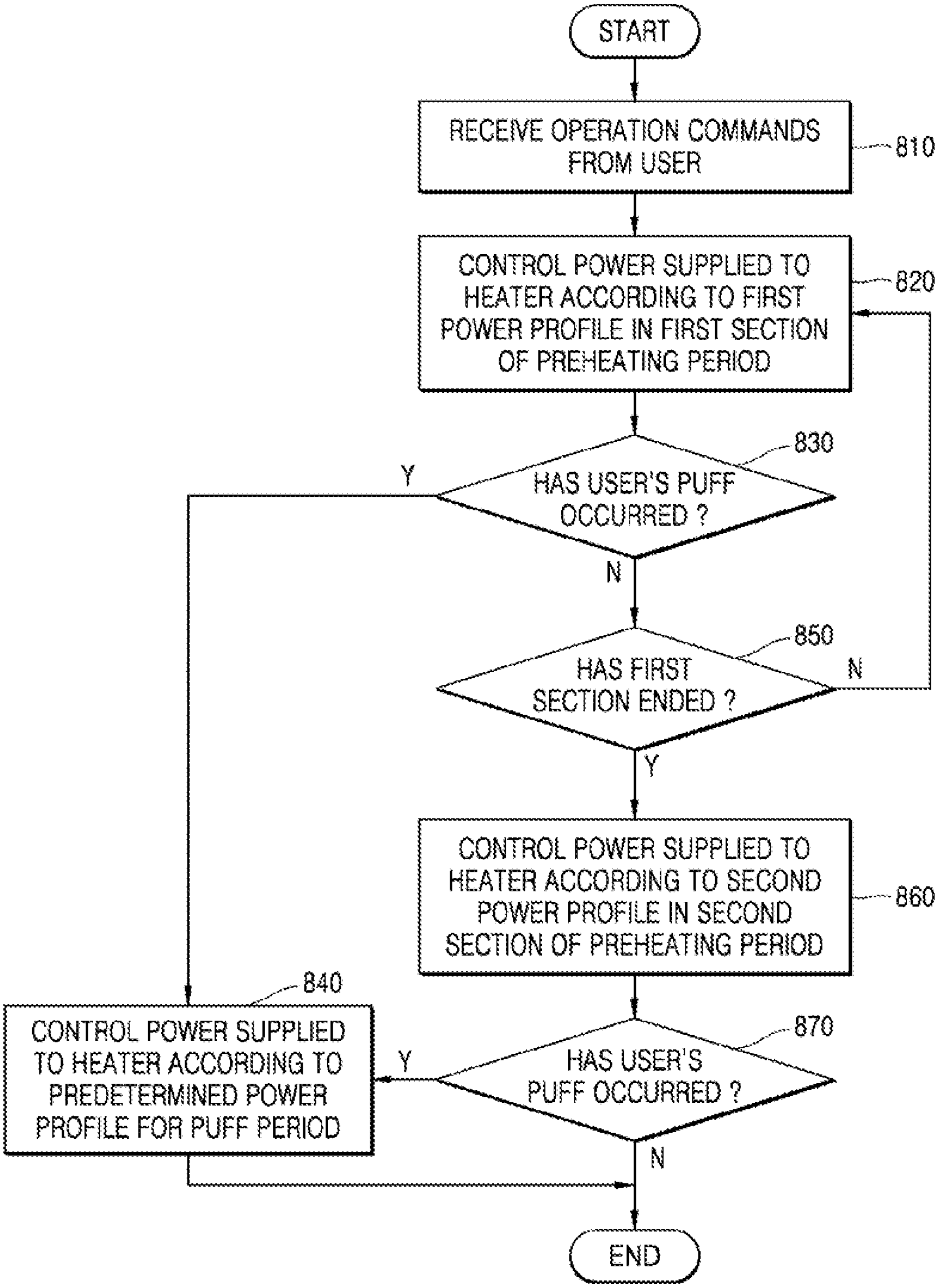

AEROSOL GENERATING DEVICE AND OPERATION METHOD THEREOF

TECHNICAL FIELD

The present disclosure relates to an aerosol generating device and an operation method thereof.

BACKGROUND ART

Recently, the demand for alternative methods to overcome the shortcomings of general cigarettes has increased. For example, there is an increasing demand for a method of generating aerosol by heating an aerosol generating material, rather than by combusting cigarettes.

Accordingly, there is a need for controlling the power supplied to the heater to effectively heat the aerosol generating material.

DISCLOSURE

Technical Solution

Technical problems to be solved by the present disclosure are to provide an aerosol generating device which controls power supplied to a heater and an operation method thereof.

According to an aspect of the present disclosure, an aerosol generating device is provided, the aerosol generating device including: a heater for heating an aerosol generating material; a battery for supplying power to the heater; and a controller for dividing a preheating period for preheating the heater into a plurality of sections, and controlling power supplied to the heater by the battery so that more power is supplied to the heater in a first section than in a second section among the plurality of sections.

Advantageous Effects

According to the present disclosure, an aerosol generating device may control power supplied to the heater so that more power is supplied to a heater in the first section than in a second section of a preheating period. As such, the temperature of the heater may be sufficiently increased before a user's first puff occurs and as a result, a sufficient vapor may be generated.

DESCRIPTION OF DRAWINGS

FIG. 1 is an exploded perspective view schematically illustrating a coupling relationship between a replaceable cartridge containing an aerosol generating material and an aerosol generating device including the same, according to an embodiment.

FIG. 2 is a perspective view of an example operating state of the aerosol generating device according to the embodiment illustrated in FIG. 1.

FIG. 3 is a perspective view of another example operating state of the aerosol generating device according to the embodiment illustrated in FIG. 1.

FIG. 4 is a block diagram illustrating hardware components of the aerosol generating device according to an embodiment.

FIG. 5 shows an embodiment of a preheating period divided into a plurality of sections.

FIG. 6 shows an embodiment in which the aerosol generating device controls power supplied to a heater.

FIG. 7 is a flowchart illustrating an embodiment in which the aerosol generating device operates.

FIG. 8 shows a flowchart for explaining another embodiment in which the aerosol generating device operates.

BEST MODE

According to an aspect of the present disclosure, an aerosol generating device may be provided, the aerosol generating device including: a heater for heating an aerosol generating material; a battery for supplying power to the heater; and a controller for dividing a preheating period for preheating the heater into a plurality of sections, and controlling power supplied to the heater by the battery so that more power is supplied to the heater in a first section than in a second section among the plurality of sections.

The first section may precede the second section, and the controller may control the power supplied to the heater according to a first power profile in the first section and controls the power supplied to the heater according to a second power profile in the second section.

The aerosol generating device may further include a sensor for sensing user's puff, and the controller may control the power supplied to the heater according to a predetermined power profile for a puff period, based on the sensor sensing the user's puff in the first section.

A duration of the first section may be shorter than or equal to 2 seconds.

The aerosol generating device may further include a user interface for receiving operation commands from a user, and the controller starts the preheating period based on the received operation commands.

The aerosol generating device may further include a sensor for detecting changes in a magnetic field, and the controller may control the power supplied to the heater according to the first power profile in the first section based on the detected changes in the magnetic field.

The aerosol generating material may be a liquid composition.

Another aspect of the present disclosure provides a power control device for controlling power supplied to an aerosol generating device, including: a battery for supplying power to a heater included in the aerosol generating device; and a controller for dividing a preheating period for preheating the heater into a plurality of sections, and controlling power supplied to the heater by the battery such that more power is supplied to the heater in a first section than in a second section among the plurality of sections, wherein the power control device is detachable from the aerosol generating device.

Another aspect of the present disclosure may provide a method of operating an aerosol generating device, the method including: controlling power supplied to a heater included in the aerosol generating device according to a first power profile in a first section of a preheating period for preheating the heater; and controlling the power supplied to the heater according to a second power profile in a second section of the preheating period, wherein the first power profile is set to supply more power to the heater than the second power profile.

Mode for Invention

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and/or operation and can be implemented by hardware components or software components and combinations thereof.

As used herein, expressions such as “at least one of,” when preceding a list of elements, modify the entire list of elements and do not modify the individual elements of the list. For example, the expression, “at least one of a, b, and c,” should be understood as including only a, only b, only c, both a and b, both a and c, both b and c, or all of a, b, and c.

Hereinafter, the present disclosure will now be described more fully with reference to the accompanying drawings, in which example embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 containing the aerosol generating material may be coupled to the main body 10. A portion of the cartridge 20 may be inserted into an accommodation space 19 of the main body 10 so that the cartridge 20 may be mounted on the main body 10.

The cartridge 20 may contain an aerosol generating material in at least one of a liquid state, a solid state, a gaseous state, and a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid, and malic acid, or may be a mixture of two or more acids selected from the above-described group, but is not limited thereto.

The cartridge 20 may be operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, in response to receiving the electrical signal from the main body 10, the cartridge 20 may convert the phase of the aerosol generating material by heating the aerosol generating material, using, for example, an ultrasonic vibration method or an induction heating method. In an embodiment, the cartridge 20 may include its own power source and generate aerosol based on an electric control signal or a wireless signal received from the main body 10.

The cartridge 20 may include a liquid storage 21 accommodating the aerosol generating material therein, and an atomizer performing a function of converting the aerosol generating material of the liquid storage 21 to aerosol.

When the liquid storage 21 “accommodates the aerosol generating material” therein, it means that the liquid storage 21 functions as a container simply holding an aerosol generating material. The liquid storage 21 may include an element impregnated with (i.e., containing) an aerosol generating material, such as a sponge, cotton, fabric, or porous ceramic structure.

The atomizer may include, for example, a liquid delivery element (e.g., a wick) for absorbing the aerosol generating material and maintaining the same in an optimal state for conversion to aerosol, and a heater heating the liquid delivery element to generate aerosol.

The liquid delivery element may include at least one of, for example, a cotton fiber, a ceramic fiber, a glass fiber, and porous ceramic.

The heater may include a metallic material such as copper, nickel, tungsten, or the like to heat the aerosol generating material delivered to the liquid delivery element by generating heat using electrical resistance. The heater may be implemented by, for example, a metal wire, a metal plate, a ceramic heating element, or the like. Also, the heater may be implemented by a conductive filament using a material such as a nichrome wire, and may be wound around or arranged adjacent to the liquid delivery element.

In addition, the atomizer may be implemented by a heating element in the form of a mesh or plate, which absorbs the aerosol generating material and maintains the same in an optimal state for conversion to aerosol, and generates aerosol by heating the aerosol generating material. In this case, a separate liquid delivery element may not be required.

At least a portion of the liquid storage 21 of the cartridge 20 may include a transparent portion so that the aerosol generating material accommodated in the cartridge 20 may be visually identified from the outside. The liquid storage 21 may include a protruding window 21*a* protruding from the liquid storage 21, so that the liquid storage 21 may be inserted into a groove 11 of the main body 10 when coupled to the main body 10. A mouthpiece 22 and/or the liquid storage 21 may be entirely formed of transparent plastic or glass. Alternatively, only the protruding window 21*a* may be formed of a transparent material.

The main body 10 includes a connection terminal 10*t* arranged inside the accommodation space 19. When the liquid storage 21 of the cartridge 20 is inserted into the accommodation space 19 of the main body 10, the main body 10 may provide power to the cartridge 20 or supply a signal related to an operation of the cartridge 20 to the cartridge 20, through the connection terminal 10*t*.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22*a* for discharging aerosol generated from the aerosol generating material inside the liquid storage 21 to the outside.

The slider 7 is coupled to the main body 10 to move with respect to the main body 10. The slider 7 covers or exposes at least a portion of the mouthpiece 22 of the cartridge 20 coupled to the main body 10 by moving with respect to the main body 10. The slider 7 includes an elongated hole 7*a* exposing at least a portion of the protruding window 21*a* of the cartridge 20 to the outside.

As shown FIG. 1, the slider 7 may have a shape of a hollow container with both ends opened, but the structure of the slider 7 is not limited thereto. For example, the slider 7 may have a bent plate structure having a clip-shaped cross-section, which is movable with respect to the main body 10 while being coupled to an edge of the main body 10. In another example, the slider 7 may have a curved semi-cylindrical shape with a curved arc-shaped cross section.

The slider 7 may include a magnetic body for maintaining the position of the slider 7 with respect to the main body 10 and the cartridge 20. The magnetic body may include a permanent magnet or a material such as iron, nickel, cobalt, or an alloy thereof.

The magnetic body may include two first magnetic bodies 8*a* facing each other, and two second magnetic bodies 8*b* facing each other. The first magnetic bodies 8*a* are arranged to be spaced apart from the second magnetic bodies 8*b* in a longitudinal direction of the main body 10 (i.e., the direction in which the main body 10 extends), which is a moving direction of the slider 7.

The main body 10 includes a fixed magnetic body 9 arranged on a path along which the first magnetic bodies 8*a* and the second magnetic bodies 8*b* of the slider 7 move as the slider 7 moves with respect to the main body 10. Two fixed magnetic bodies 9 of the main body 10 may be mounted to face each other with the accommodation space 19 therebetween.

The slider 7 may be stably maintained in positions where an end of the mouthpiece 22 is covered or exposed, by magnetic force acting between the fixed magnetic body 9 and the first magnetic body 8*a* or between the fixed magnetic body 9 and the second magnetic body 8*b*.

The main body 10 includes a position change detecting sensor 3 arranged on the path along which the first magnetic body 8*a* and the second magnetic body 8*b* of the slider 7 move as the slider 7 moves with respect to the main body 10. The position change detecting sensor 3 may include, for example, a Hall integrated circuit (IC) that uses the Hall effect to detect a change in a magnetic field, and may generate a signal based on the detected change.

In the aerosol generating device 5 according to the above-described embodiments, the main body 10, the cartridge 20, and the slider 7 have approximately rectangular cross-sectional shapes when viewed in the longitudinal direction, but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly, and may be curved in a streamlined shape or bent at a preset angle to be easily held by the user.

FIG. 2 is a perspective view of an example operating state of the aerosol generating device according to the embodiment illustrated in FIG. 1.

In FIG. 2, the slider 7 is moved to a position where the end of the mouthpiece 22 of the cartridge coupled to the main body 10 is covered. In this state, the mouthpiece 22 may be safely protected from external impurities and kept clean.

The user may check the remaining amount of aerosol generating material contained in the cartridge by visually checking the protruding window 21*a* of the cartridge through the elongated hole 7*a* of the slider 7. The user may move the slider 7 in the longitudinal direction of the main body 10 to use the aerosol generating device 5.

FIG. 3 is a perspective view of another example operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In this state, the user may insert the mouthpiece 22 into his or her mouth and inhale aerosol discharged through the discharge hole 22*a* of the mouthpiece 22.

As shown in FIG. 3, the protruding window 21*a* of the cartridge is still exposed to the outside through the elongated hole 7*a* of the slider 7 when the slider 7 is moved to the position where the end of the mouthpiece 22 is exposed to the outside. Thus, the user may be able to visually check the remaining amount of aerosol generating material contained in the cartridge, regardless of the position of the slider 7.

FIG. 4 is a block diagram illustrating components of the aerosol generating device according to an embodiment.

Referring to FIG. 4, the aerosol generating device 100 may include a battery 110, a heater 120, a sensor 130, a user interface 140, a memory 150, and a controller 160. However, the internal structure of the aerosol generating device 100 is not limited to the structures illustrated in FIG. 4. Also, it will be understood by one of ordinary skill in the art that some of the hardware components shown in FIG. 4 may be omitted or new components may be added according to the design of the aerosol generating device 100.

In an embodiment where the aerosol generating device 100 includes a main body without a cartridge, the components shown in FIG. 4 may be located in the main body. In another embodiment where the aerosol generating device 100 includes a main body and a cartridge, the components shown in FIG. 4 may be located in the main body and/or the cartridge.

The battery 110 supplies electric power to be used for the aerosol generating device 100 to operate. For example, the battery 110 may supply power such that the heater 120 may be heated. In addition, the battery 110 may supply power required for operation of other components of the aerosol generating device 100, such as the sensor 130, the user interface 140, the memory 150, and the controller 160. The battery 110 may be a rechargeable battery or a disposable battery. For example, the battery 110 may be a lithium polymer (LiPoly) battery, but is not limited thereto.

The heater 120 receives power from the battery 110 under the control of the controller 160. The heater 120 may receive power from the battery 110 and heat a cigarette inserted into the aerosol generating device 100, or heat the cartridge mounted on the aerosol generating device 100.

The heater 120 may be located in the main body of the aerosol generating device 100. Alternatively, the heater 120 may be located in the cartridge. When the heater 120 is located in the cartridge, the heater 120 may receive power from the battery 110 located in the main body and/or the cartridge.

The heater 120 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 120 may be implemented by a metal wire, a metal plate on which an electrically conductive track is arranged, or a ceramic heating element, but is not limited thereto.

In an embodiment, the heater 120 may be included in the cartridge. The cartridge may include the heater 120, the liquid delivery element, and the liquid storage. The aerosol generating material accommodated in the liquid storage may be absorbed by the liquid delivery element, and the heater 120 may heat the aerosol generating material absorbed by the liquid delivery element, thereby generating aerosol. For example, the heater 120 may include a material such as nickel or chromium and may be wound around or arranged adjacent to the liquid delivery element.

In another embodiment, the heater 120 may heat the cigarette inserted into the accommodation space of the aerosol generating device 100. As the cigarette is accommodated in the accommodation space of the aerosol generating device 100, the heater 120 may be located inside and/or outside the cigarette. Accordingly, the heater 120 may generate aerosol by heating the aerosol generating material in the cigarette.

Meanwhile, the heater 120 may include an induction heater. The heater 120 may include an electrically conductive coil for heating a cigarette or the cartridge by an induction heating method, and the cigarette or the cartridge may include a susceptor which may be heated by the induction heater.

The aerosol generating device 100 may include at least one sensor 130. A result sensed by the at least one sensor 130 is transmitted to the controller 160, and the controller 160 may control the aerosol generating device 100 by controlling the operation of the heater, restricting smoking, determining whether a cigarette (or a cartridge) is inserted, displaying a notification, etc.

For example, the sensor 130 may include a puff detecting sensor. The puff detecting sensor may detect a user's puff based on a temperature change, a flow change, a voltage change, and/or a pressure change.

In addition, the at least one sensor 130 may include a temperature sensor. The temperature sensor may detect a temperature of the heater 120 (or an aerosol generating material). The aerosol generating device 100 may include a separate temperature sensor for sensing a temperature of the heater 120, or the heater 120 itself may serve as a temperature sensor without a separate temperature sensor. Alternatively, an additional temperature sensor may be further included in the aerosol generating device 100 while the heater 120 may serve as a temperature sensor.

The sensor 130 may include a position change detecting sensor. The position change detecting sensor may detect a change in a position of the slider which is coupled to the main body and slides along the main body.

The user interface 140 may provide the user with information about the state of the aerosol generating device 100. For example, the user interface 140 may include various interfacing devices, such as a display or a light emitter for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and/or communication interfacing modules for performing wireless communication (for example, Wi-Fi, Wi-Fi direct, Bluetooth, near-field communication (NFC), etc.) with external devices.

The memory 150 may store various data processed or to be processed by the controller 160. The memory 150 may include various types of memories, such as dynamic random access memory (DRAM), static random access memory (SRAM), read-only memory (ROM), electrically erasable programmable read-only memory (EEPROM), etc.

For example, the memory 150 may store an operation time of the aerosol generating device 100, the maximum number of puffs, the current number of puffs, at least one temperature profile, data on a user's smoking pattern, etc.

The controller 160 may control overall operations of the aerosol generating device 100. The controller 160 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The controller 160 analyzes a result of the sensing by at least one sensor 130, and controls processes that are to be performed subsequently.

The controller 160 may control power supplied to the heater 120 so that the operation of the heater 120 is started or terminated, based on the result of the sensing by the sensor 130. In addition, based on the result of the sensing by the sensor 130, the controller 160 may control the amount of power supplied to the heater 120 and the time at which the power is supplied, so that the heater 120 is heated to a predetermined temperature or maintained at an appropriate temperature.

In an embodiment, the controller 160 may set a mode of the heater 120 to a pre-heating mode to start the operation of the heater 120 after receiving a user input to the aerosol generating device 100. In addition, the controller 160 may switch the mode of the heater 120 from the pre-heating mode to an operation mode after detecting a user's puff by using the puff detecting sensor. In addition, the controller 160 may stop supplying power to the heater 120 when the number of puffs reaches a preset number after counting the number of puffs by using the puff detecting sensor.

The controller 160 may control the user interface 140 based on the result of the sensing by the at least one sensor 130. For example, when the number of puffs counted by the puff detecting sensor reaches a preset number, the controller 160 may notify the user by using the user interface 140 (e.g., a light emitter, a motor, a speaker, etc.) that the aerosol generating device 100 will soon be terminated.

Although not illustrated in FIG. 4, the aerosol generating device 100 may be combined with a separate cradle to form an aerosol generating system. For example, the cradle may be used to charge the battery 110 of the aerosol generating device 100. For example, the aerosol generating device 100 may be supplied with power from a battery of the cradle to charge the battery 110 of the aerosol generating device 100 while being accommodated in an accommodation space of the cradle.

The controller 160 may divide a preheating period for preheating the heater 120 into a plurality of sections. According to an example, the controller 160 may divide the preheating period into two time sections, such as a first section and a second section. For example, when the preheating period is 3 seconds, the first period may be 0 to 1.5 seconds, and the second period may be 1.5 seconds to 3 seconds. According to another example, the controller 160 may divide the preheating period into three or more sections.

The controller 160 may control power so that more power is supplied to the heater 120 in the first section than in the second section among the plurality of sections. In other words, the controller 160 may control power to be supplied to the heater 120 according to a first power profile in the first section, and may control power to be supplied to the heater 120 according to a second power profile in the second section. In this case, the first power profile may be set to supply more power to the heater than the second power profile. For example, the first power profile may be set to supply 1.2 W to the heater 120 for 2 seconds, and the second power profile may be set to supply 0.9 W to the heater 120 for 1 second. According to an embodiment, the first section among the plurality of sections may precede or follow the second section.

The power profile may indicate a change in power supplied to the heater 120 over time. In addition, the power profile may include information on power (W) supplied to the heater 120 and information on a time when power is supplied to the heater 120, information on the amount of power supplied to the heater 120, and information on a pulse width modulation (PWM) pulse signal for power supplied to the heater 120, and the like.

When the preheating period for preheating the heater is divided into three or more sections, the controller 160 may control the aerosol generating device 100 to supply different power to the heater 120 in at least one section. For example, the controller 160 may control the aerosol generating device 100 to supply more power to the heater 120 in the second section than in the first section and in the third section.

The controller 160 may start the preheating period for preheating the heater based on commands from the user. For example, when the user interface 140 receives operation commands from the user, the controller 160 may divide the preheating period into a plurality of sections and control the aerosol generating device 100 to supply more power to the heater 120 in the first section than in the second section. In addition, when the sensor 130 detects a change in the magnetic field, and the controller 160 may control power supplied to the heater 120 for the preheating period based on the change in the magnetic field. For example, the sensor 130 may be a hall sensor that detects the change in the magnetic field according to the movement of the slider 7 in the aerosol generating device 100.

When the user's puff occurs in the first section among the plurality of sections of the preheating period, the controller 160 may stop power control according to the first section and control power supplied to the heater 120 according to a predetermined power profile for a puff period. Specifically, the controller 160 may control the power supplied to the heater 120 according to the first power profile for the first section, and may perform power control according to a predetermined power profile from the start of the puff when the start of the user's puff is detected in the first section. For example, the controller 160 may supply (i.e., control the aerosol generating device 100 to supply) 1.2 W to be supplied to the heater 120 for 2 seconds, which is the first section of the preheating period. However, when the user's puff start is detected within the first section, the controller 160 may supply 4 W to the heater 120 for 3 seconds according to the power profile for a puff period from the start time of the puff.

Accordingly, the aerosol generating device 100 may supply more power to the heater 120 in the first section than in the second section of the preheating period. As such, the heater 120 may be sufficiently heated before the user's first puff occurs. Since the aerosol generating device 100 initially supplies sufficient power to the heater 120 during the preheating period, the heater 120 may be heated to a temperature that is high enough to generate sufficient vapor during the user's first puff. For example, when 0.9 W of power is constantly applied to the heater 120 throughout the preheating period, the heater 120 may not be sufficiently heated until just before the user's first puff occurs. However, when power greater than 0.9 W is applied to the heater 120 in an initial period of the preheating period, the heater 120 may be sufficiently heated before the user's first puff of the user occurs. As a result, the aerosol generating device 100 may generate sufficient vapor in the user's first puff.

FIG. 5 shows an embodiment of a preheating period divided into a plurality of sections.

As shown in FIG. 5, the aerosol generating device 100 may divide the preheating period into a first section and a second section, may control power to be supplied to the heater 120 according to the first power profile in the first section, and may supply power to the heater 120 according to the second power profile in the second section. The first power profile may be set to supply more power to the heater than the second power profile. For example, when the preheating period is 3 seconds in total, the first power profile may be set such that 1.2 W of power is supplied to the heater 120 for 1.5 seconds, and the second power profile may be set such that 0.8 W of power is supplied to the heater 120 for the remaining 1.5 seconds.

The aerosol generating device 100 may supply power to the heater 120 according to a predetermined power profile in the puff period following the preheating period. Specifically, when the user's puff occurs in the preheating period, the aerosol generating device 100 may proceed with a first puff period from a user's puff start time. In other words, the aerosol generating device 100 switches to the power profile for the first puff period when the user starts puffing. For example, the power profile corresponding to the first puff period may be set such that 4 W of power is supplied to the heater 120 for 3 seconds.

FIG. 6 shows an embodiment in which the aerosol generating device controls power supplied to a heater.

The aerosol generating device 100 may control power supplied to the heater 120 according to the power profile 610 shown in FIG. 6.

The aerosol generating device 100 may start preheating the heater based on operation commands from the user.

The aerosol generating device 100 may divide the preheating period into a first section and a second section, and more power is supplied to the heater 120 in the first section than in the second section. For example, the aerosol generating device 100 may supply 1.2 W to the heater 120 in the first section, and supply 0.9 W to the heater 120 in the second section.

On detecting the user's first puff while the preheating period is in progress, and aerosol generating device 100 may proceed to the first puff period from the user's puff start time. In other words, the aerosol generating device 100 may supply power to the heater 120 in the first puff period according to the power profile for the first puff period. For example, in the first puff period, the aerosol generating device 100 may initially supply 4 W of power to the heater 120 and gradually decrease power.

During the time interval from the end of the first puff period to the detection of the user's second puff, the aerosol generating device 100 may control power supplied to the heater 120 according to a preset power profile. For example, the aerosol generating device 100 may supply 0.9 W of power to the heater 120 from the end time of the first puff to the start time of the second puff.

Similarly, the aerosol generating device 100 may control power supplied to the heater 120 according to a power profile for a second puff period in the user's second puff period. For example, the aerosol generating device 100 may initially supply 3 W of power to the heater 120 and gradually lowers the power.

FIG. 7 is a flowchart illustrating a method of controlling power supplied to the heater according to an embodiment.

FIG. 7 only shows certain steps that are processed in the aerosol generating device 100. Accordingly, the above descriptions regarding the aerosol generating device 100 which are omitted in FIG. 7 may be also applied to the method shown in FIG. 7.

In step 710, the aerosol generating device 100 may control the power supplied to the heater according to the first power profile in the first section of the preheating period. According to an example, the aerosol generating device 100 may divide the preheating period into a first section and a second section, and control power supplied to the heater according to a preset first power profile in the first section. According to another example, the aerosol generating device 100 may divide the preheating period into at least three sections, and may control power supplied to the heater according to a first power profile set in a first section of the at least three sections. The aerosol generating device 100 may supply more power to the heater in the first section, which is the first section of the preheating period, than in the other sections of the preheating period.

Although not shown in FIG. 7, if the user's puff occurs in the first section of the preheating period, the aerosol generating device 100 may stop controlling power supplied to the heater according to the first power profile, and start controlling power supplied to the heater according to a predetermined power profile for a puff period. Specifically, when the start of the user's puff is detected in the first section, the aerosol generating device 100 may control power supplied to the heater according to the predetermined power profile from the start time of the puff.

In step 720, the aerosol generating device 100 may control the power supplied to the heater according to the second power profile in the second section of the preheating period. Here, the second power profile may be set to supply less power to the heater than the first power profile.

FIG. 8 shows a flowchart illustrating a method of controlling power supplied to the heater according to another embodiment.

FIG. 8 only shows certain steps that are processed in the aerosol generating device 100. Accordingly, the above descriptions regarding the aerosol generating device 100 which are omitted in FIG. 8 may be applied to the method shown in FIG. 8.

In step 810, the aerosol generating device 100 may receive operation commands from the user.

In step 820, the aerosol generating device 100 may control power supplied to the heater according to the first power profile in the first section of the preheating period.

In step 830, the aerosol generating device 100 may determine whether the user's puff has occurred. In other words, the aerosol generating device 100 may determine whether the user's puff occurred during the first section of the preheating period.

If it is determined that the user's puff has occurred in the first section of the preheating period, the aerosol generating device 100 stops power control according to the first section, and may control power supplied to the heater according to a predetermined power profile for a puff period in step 840.

If it is determined that the user's puff does not occur in the first section of the preheating period, the aerosol generating device 100 may determine whether the first section has ended in step 850. The aerosol generating device 100 may continuously control power supplied to the heater according to the first power profile until the first section ends.

When the first section ends, in step 860, the aerosol generating device 100 may control power supplied to the heater according to the second power profile in the second section of the preheating period.

In step 870, the aerosol generating device 100 may determine whether the user's puff has occurred in the second section. If it is determined that a user's puff has occurred, the aerosol generating device 100 may stop controlling power according to the second power profile, and control power supplied to the heater according to a predetermined power profile for a puff period in step 840.

The above-described method may be implemented as a program executable on a computer, and may be implemented on a general-purpose digital computer that operates the program using a computer-readable recording medium. In addition, the data structure used in the above-described method may be recorded on a computer-readable recording medium through various means. The computer-readable recording medium includes a storage medium such as a magnetic storage medium (e.g., ROM, RAM, USB, floppy disk, hard disk, etc.) and an optical reading medium (e.g., CD-ROM, DVD, etc.).

At least one of the components, elements, modules or units (collectively "components" in this paragraph) represented by a block in the drawings such as the controller 160 and the user interface 140 in FIG. 4, may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

What is claimed is:

1. An aerosol generating device comprising:
a heater configured to heat an aerosol generating material;
a battery configured to supply power to the heater; and
a controller configured to:
divide a preheating period for preheating the heater into a plurality of sections, and
control power supplied to the heater from the battery such that:
a first power is supplied to the heater in a first section among the plurality of sections of the preheating period;
a second power is supplied to the heater in a second section among the plurality of sections of the preheating period, the second power being less than the first power; and
a third power is supplied to the heater in a first puff period in response to detecting a user's puff, the third power being greater than the first power and the second power.

2. The device of claim 1, wherein
the first section among the plurality of sections of the preheating period precedes the second section among the plurality of sections of the preheating period, and
the controller is further configured to control the power supplied to the heater according to a first power profile in the first section, and control the power supplied to the heater according to a second power profile in the second section.

3. The device of claim 1, further comprising a sensor configured to sense the user's puff,
wherein the controller is further configured to control the power supplied to the heater according to a predetermined power profile for the first puff period, based on the sensor sensing the user's puff in the first section among the plurality of sections of the preheating period.

4. The device of claim 1, wherein a duration of the first section among the plurality of sections of the preheating period is shorter than or equal to two (2) seconds.

5. The device of claim 1, further comprising a user interface configured to receive operation commands from a user,
wherein the controller is further configured to start the preheating period based on the received operation commands.

6. The device of claim 1, further comprising a sensor configured to detect changes in a magnetic field,
wherein the controller is further configured to control the power supplied to the heater according to a first power profile in the first section among the plurality of sections of the preheating period based on the detected changes in the magnetic field.

7. The device of claim 1, wherein the aerosol generating material comprises a liquid composition.

8. A main body capable of combining with a cartridge including an aerosol generating material and a heater for heating the aerosol generating material, the main body comprising:
a battery configured to supply power to the heater; and
a controller configured to:
divide a preheating period for preheating the heater into a plurality of sections, and
control power supplied to the heater by the battery such that:
a first power is supplied to the heater in a first section among the plurality of sections of the preheating period;
a second power is supplied to the heater in a second section among the plurality of sections of the preheating period, the second power being less than the first power; and
a third power is supplied to the heater in a first puff period in response to detecting a user's puff, the third power being greater than the first power and the second power.

9. A method of operating an aerosol generating device, the method comprising:
controlling power supplied to a heater included in the aerosol generating device according to a first power profile in a first section of a preheating period for preheating the heater; and
controlling the power supplied to the heater according to a second power profile in a second section of the preheating period,
controlling the power supplied to the heater according to a predetermined power profile in in a first puff period in response to detecting a user's puff,
wherein the first power profile is set to supply more power to the heater than the second power profile, and
wherein the predetermined power profile is set to supply more power to the heater than the first power profile and the second power profile.

10. The method of claim 9, wherein the controlling of the power supplied to the heater according to the first power profile comprises, based on the user's puff being detected in the first section of the preheating period, stopping controlling the power supplied to the heater according to the first power profile and controlling the power supplied to the heater according to the predetermined power profile for the first puff period.

* * * * *